United States Patent [19]

Burkhardt et al.

[11] 4,324,027

[45] Apr. 13, 1982

[54] MACHINE INCLUDING A CLAMPING DEVICE FOR LOCATING A WORKPIECE IN A GIVEN PROCESSING POSITION

[76] Inventors: Friedrich Burkhardt, Brunnenweilerstr. 13, 7332 Eislingen/Fils; Hans Staiger, Oechslinstr. 32, 7320 Göppingen, both of Fed. Rep. of Germany

[21] Appl. No.: 55,942

[22] Filed: Jul. 9, 1979

[30] Foreign Application Priority Data

Jun. 29, 1978 [DE] Fed. Rep. of Germany ....... 2828559

[51] Int. Cl.³ .......................................... B23Q 41/02
[52] U.S. Cl. .................................. 29/33 P; 29/1 A; 29/563; 198/345; 198/472; 408/70; 409/172
[58] Field of Search ...................... 29/33 P, 563, 1 A; 269/59, 82; 408/70; 409/158, 159, 164, 172, 174, 256, 257; 198/345, 472

[56] References Cited

U.S. PATENT DOCUMENTS

| | | | |
|---|---|---|---|
| 2,025,070 | 12/1935 | Nygren | 409/257 X |
| 2,063,955 | 12/1936 | Schlitz | 409/257 X |
| 2,728,268 | 12/1955 | Clifton et al. | 29/33 P |
| 2,819,784 | 1/1958 | Brown, Jr. | 29/1 A X |
| 2,944,467 | 7/1960 | Casanov | 29/1 A X |
| 3,106,110 | 10/1963 | Senn | 29/1 A X |
| 3,271,840 | 9/1966 | Solski et al. | 29/33 P |
| 3,825,245 | 7/1974 | Osburn et al. | 29/563 X |
| 3,986,617 | 10/1976 | Blomquist | 29/563 X |

Primary Examiner—Z. R. Bilinsky
Attorney, Agent, or Firm—John C. Evans

[57] ABSTRACT

A work support or pallet is slidable onto a holding device on bearing surfaces along a rectilinear guide defining parallel angular paths. The holding device has two clamping slides which are urged transversely to the rectilinear guide to bear on a mating surface part of work support to locate it both in the longitudinal direction and transversely thereof. One slide has slanting teeth mating with teeth on the work support in such a manner that the clamping force components locate the work support with respect to both longitudinal and transverse directions and hold the work support against the bearing surfaces.

14 Claims, 9 Drawing Figures

MACHINE INCLUDING A CLAMPING DEVICE FOR LOCATING A WORKPIECE IN A GIVEN PROCESSING POSITION

SUMMARY OF THE INVENTION

The invention relates to a clamping device with a holding device disposed at a processing station and adapted for alignment and clamping of a work support. Clamping devices of this kind are used in particular when transporting workpieces which must be transferred with the same clamping from processing station to processing station along a production line.

In clamping devices of this kind it is essential for the work support to be located with repeatable precision on a plurality of holding devices which are integrated with the production line. In one known construction this is achieved in that the work support can be fixed on the individual holding devices by means of locating bolts disposed therein which are provided in pairs on both sides of a rectilinear guide and can be inserted into corresponding bores of the work support. This kind of location calls for additional means by which the work support can also be urged under pressure against the support surfaces of the holding devices. Furthermore, the fitting tolerances with which the locating bolts are retained in the bores of the work support, are included as an additional factor of inaccuracy.

An improved clamping device is shown, characterised by a smaller number of components adapted to provide location, in which the surfaces of a V-shaped tenon, integrally formed on one side of the work support, are brought to bear on the circumference of a cylinder which is provided on the holding device, and in which an additional surface part, provided on the same side of the work support, is brought to bear under pressure on a mating surface part of the holding device at a distance from the cylinder. The V-shaped tenon as well as the second surface part are disposed on the opposite side of a V-shaped mortise, provided in the manner of a dovetail joint on one side of the rectilinear guide. This ensures that when the work support is locked the dovetail joint is also positively pressed against one support surface on one side of the rectilinear guide.

It would be desirable to improve a clamping device of this kind so that without any additional technological complexity the work support can be pressed on the support surfaces when the holding device is secured on both sides of the rectilinear guide and therefore stressing on the holding device takes place in a defined support position of the work support.

The present invention provides a clamping device for locating a workpiece in a given processing position, with a holding device, disposed on a processing station and adapted for the alignment and clamping of a work support which is constructed in the manner of a pallet, can be slidingly advanced by means of a changeover device and can move on the holding device on support surfaces along a rectilinear guide, at least one side of which is constructed as guide, into its holding position in which the work support can be located on abutment surfaces and alignment surfaces, both in the longitudinal direction and transversely thereto, by means of at least one clamping element which is disposed on the holding device, acts transversely to the rectilinear guide and moves under the action of at least one power accumulator on a mating surface of the work support, characterised in that the clamping element can be brought to bear on a surface part of the work support, which said surface part is situated opposite to that part of the rectilinear guide which is constructed as a prismatic guide and the clamping element and the surface part co-operating positively therewith are constructed so that the clamping force is divided into partial clamping forces and by virtue of said construction the work support can be located in both directions of the rectilinear guide and can also be pressed upon the support surfaces of the holding device.

The invention allows for several embodiments of the clamping element and of the work support surface part co-operating therewith and the support surfaces can be provided beneath or above the corresponding guide surfaces of the work support.

The preferred embodiment of the clamping element is the sujbect of this invention in which the end of the clamping element adapted to cooperate with the work support is provided with a plurality of sloping surfaces in which the first sloping surface is defined as being in the longitudinal direction of the work support and by a direction which forms an acute angle with the transverse direction of the clamping element; that is, the surfaces which form the upper portion of a mortise, the second sloping surface is defined by two additional surfaces which form an angle with each other and enclose acute angles with the transverse direction of the clamping element as well as with the sliding direction of the work support; that is, the surfaces which form the upper portion of a tenon. The combination of which forms a dovetail juncture. The sloping surfaces of the clamping element according to the said claim co-operating with corresponding mating surfaces of the work support can be arranged so that the affected end of the clamping element forms an engagement tooth which can be brought into positive engagement with a corresponding recess of the work support. To this end it is particularly advantageous to construct the clamping element having slanting teeth on its sloping surface engaging corresponding slanting teeth on the sloping surface on the work support. This construction enables the structural height of the clamping element to be kept correspondingly small while achieving optimum stability.

In a further embodiment of the invention it is advantageous to construct the rectilinear guide in accordance with having both lateral sides of the rectilinear guide in the form of a mortise with at least one lateral side having slanting teeth, co-operating with the clamping element in this case which can be integrally formed on one guide surface of one of the two angular guides.

The clamping element can be actuated in different manner. Preferably a final control element is provided to this end and co-operates with at least one power accumulator which tends to maintain the said control element constantly in its clamped position. This construction also enables more than one clamping element to be disposed and enables two clamping elements to be provided at a distance from each other which can be jointly driven by the final control element into their clamping or released position. Accordingly it is also advantageous to this end to interpose drivers between the clamping elements, constructed as clamping slides, and the final control element so that the common driver is provided for adjusting the clamping slides in the clamping direction and separate drivers, which can be actuated by the final control element, are provided for the return of said slides into their released position.

In the preferred embodiment, the driver which drives the clamping slides jointly into their clamp position is constructed as a rocker which ensures that despite clearance between the components both clamping slides transmit the same contact pressure upon the work support.

With the rocker transmitting by means of convexly curved surfaces on clamping slide shoulder surfaces, more particularly those disposed at right angles to each other, there will be the advantage that the rocker can transmit forces on the clamping slides, which forces act both in the clamping direction as well as perpendicularly thereto.

Given a suitable arrangement of the serrated clamping slide in the holding device, the force components acting perpendicularly to the clamping direction can also be utilized for urging one longitudinal edge of the clamping slide in the course of the motion thereof in the clamping direction against a guide surface under pressure so that the said clamping slide is moved without clearance into its clamping position thus ensuring that the positioning accuracy cannot be impaired by any guiding tolerance.

To transfer the clamping slide into the release position the final control element for actuating the clamping slide can be actuated by a separate actuating device. A further embodiment of the invention to includes a control slide in the holding device, parallel with the rectilinear guide adapted to move along its longitudinal axis when displaced or moved by an actuating device; however, it is possible to dispense with such an additional actuating device and use comprehensive programming of the CMC control system for driving the said device. In this case the traversing motion of a support slide which supports the holding device and is associated with a machine tool or production machine can also be utilized for adjusting the final control element. For reasons of construction it is convenient for the part member for adjusting the control slide to be formed by an actuating rod disposed parallel in the holding device so that the control slide can be constructed as a relatively shallow component which can therefore be advantageously accommodated in the holding device. To operate the actuating rod in dependence of the motion of a machine slide adapted to support the holding device it is advantageous to associate it in the affected operating station with a stationary stop abutment against with the actuating rod can move to release the work support. The stationary stop abutment will conveniently be constructed as a sloping cam so that only one slide motion is necessary.

The table motion which must be performed so that the final control slide can be actuated by the machine slide, can also be utilized to positively couple the work support to a driver of a work support traversing device by means of which the work support can be advanced to a changeover device or to a further holding device. An automatically controlled device of the kind for clamping and releasing of a work support is regarded within the scope of the present invention as an independently protectable system, more particularly if its constructed embodiment deviates, where appropriate, from that defined in the claims.

BRIEF DESCRIPTION OF THE DRAWINGS

The invention will now be described by way of example with reference to the accompanying drawings, in which.

DETAILED DESCRIPTION OF THE INVENTION

Figure 1:
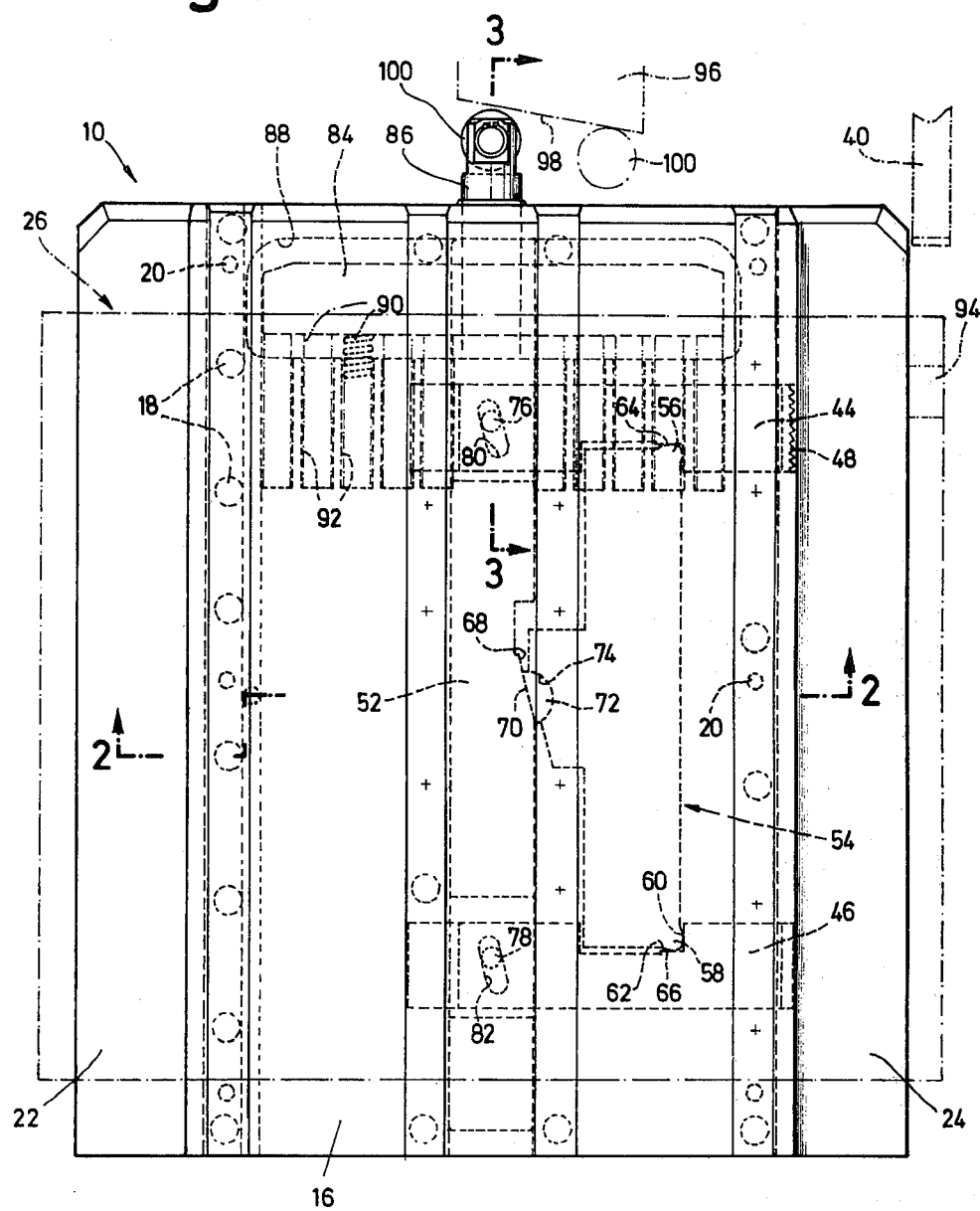
FIG. 1 is a plan view of a clamping device.
Figure 2:
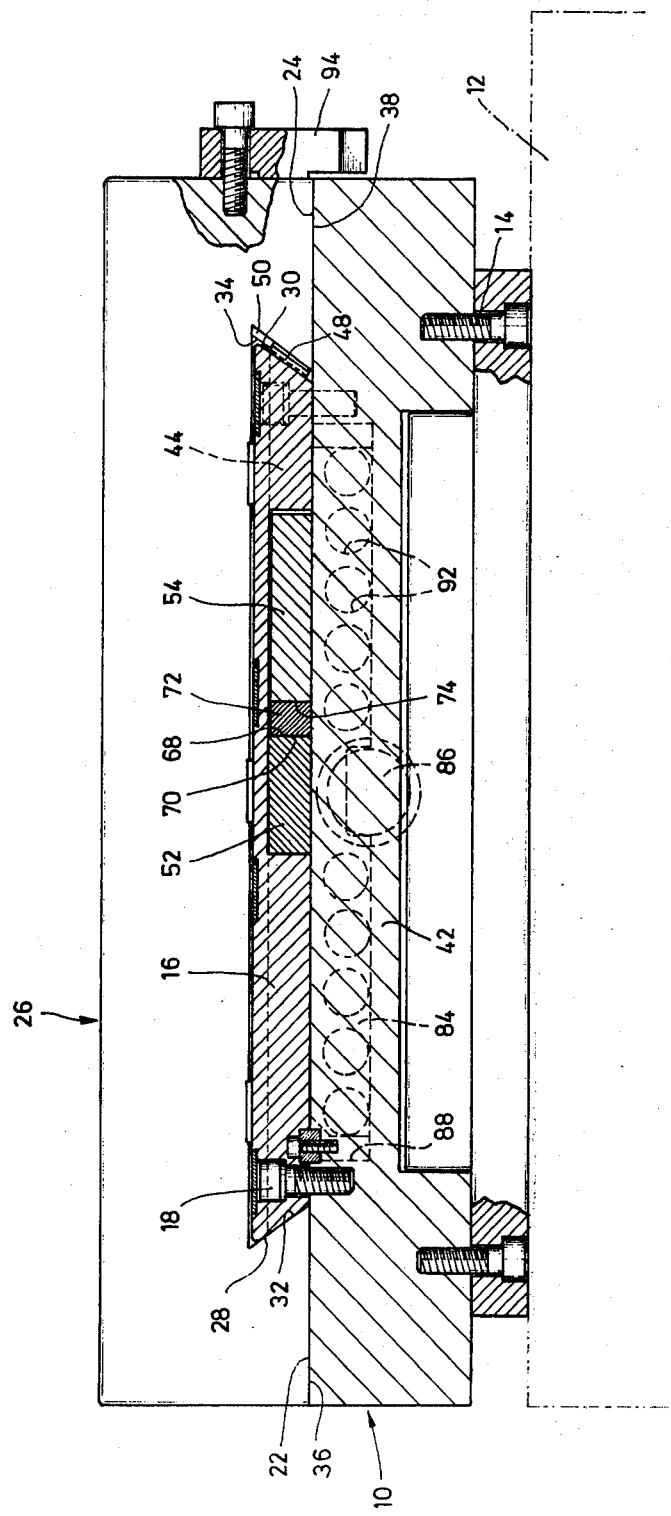
FIG. 2 is a section along the line 2—2 of FIG. 1.

The clamping device illustrated in FIG. 2 comprises a holding device 10 mounted on a machine table 12 of a machine tool or production machine, by means of screw fasteners 14. The holding device can be mounted directly on a machine table which can move in one direction or in two directions which are perpendicular to each other or can be mounted on a table accessory which in turn forms a part table so that the clamping device can also be rotated about a pivot axis in addition to translational motion.

At its top the holding device 10 is provided with a rectilinear guide plate 16 secured by means of screw fasteners 18 and pins 20 on the holding device. The rectilinear guide plate 16, together with top, plane bearing surfaces 22 and 24 of holding device 10 adjacent to the plate, forms angular guides, more particularly in the form of a tenon of a dovetail juncture, for guiding a work support 26, forming a so-called pallet, on the holding device 10. The work support 26 has sloping guide surfaces 32, 34 in the form of a mortise of a dovetail juncture which are complementary to the lateral sloping contact surfaces 28, 30 of the dovetail tenon, and has bottom, plane support surfaces 36, 38 which bear on the surfaces 22, 24 of holding device 10.

By means of a changeover device 39 (FIGS. 4 to 9) and a driver 40 the work support 26 is advanced to the holding device 10 and is moved on the holding device into an approximate holding position while sliding along the rectilinear guide. Thereafter the work support 26 is secured by suitable clamping and locking means in a predetermined position on the holding device, both in the sliding direction as well as transversely thereto. To this end the clamping and locking means are so constructed that individual work supports 26 can be successively connected with absolute precision to the holding device in the same holding position with a high degree of accuracy, i.e. over prolonged periods. To this end, two clamping elements or slides 44, 46, adjustable transversely to the rectilinear guide 16, are provided at a parallel distance from each other between the bottom part 42 of the holding device 10 and the top part of the rectilinear guide plate 16. The clamping slides 44, 46 can be brought to bear against one of the two guiding surfaces of the work support 26, for example on the sloping guiding surface 34. While the clamping slide 46 can be pressed against the guiding surface 34 merely with frictional contact, the end of the clamping slide 44 adapted to co-operate with the guiding surface 34 is so constructed that its clamping force acting on the guiding surface, and therefore on the work support, is divided into component forces by means of which the work support can be secured in both directions of the rectilinear guide and can also be pressed upon the bearer surfaces 22, 24 of the holding device. The front end of the clamping slide 44 is therefore provided with slanting teeth 48 associated with complementary mating teeth 50 on the guiding surface 34 of the work support. The slanting teeth 48, 50 enable the work support 26 to be transferred into its holding position without the need for exercising great accuracy, because during the clamping operation the work support is positively set by the mating slanting teeth 48, 50 into the precise position relative to the holding device.

When the work support 26 is secured by the two clamping slides 44, 46, which bear on the guide surface 34 of the work support as already mentioned above, the work support 26 is displaced to the right as viewed in FIG. 2 and its guide surface 32 is brought to bear against the sloping contact surface 28 of the dovetail tenon. As a consequence the bottom support surfaces 36, 38 of the work support 26 are brought to bear on both sides against the bearer surfaces 22, 24 of the holding device 10. This ensures that in the clamped state, the work support 26 is in a defined holding position on the holding device 10 on both sides of the rectilinear guide plate 16.

Instead of being provided with slanting teeth 48, the clamping slide 44 could also be provided at its free end with only one tooth, which could be positively brought into engagement with an indentation in the guide surface 34 of the work support. Furthermore, in place of the teeth of approximately triangular cross-section it is also possible to provide teeth whose cross-section is, for example, semicircular.

Both clamping slides 44, 46 can be slid in both directions by means of a common control slide 52. This extends along the plane of the clamping slides 44, 46, transversely (more particularly perpendicular) to them. The clamping slides 44, 46 are driven into the clamped position by an interposed rocker 54 which is appropriately adjustable in the plane of the clamping slides, between them, and is slidable in the plane of motion of the clamping slides.

To this end, the rocker 54 transmits by means of oppositely disposed endpieces 56, 58 on respective shoulder surfaces 60, 62, advantageously arranged perpendicularly to each other, and the rocker endpieces 56, 58 bear on the shoulder surfaces with convexly curved contact surfaces 64, 66 to maintain slidable contact between the rocker 54 and the clamping slides 44, 46. For the rocker 54 to be adjusted by the control slide 52 the latter has a wedge or slanted surface 68 which co-operates with a corresponding mating slanted surface 70 disposed on a rolling member 72 which functions as a transmitting element between the control slide 52 and the rocker 54. The rolling member 72 is rollably disposed in a semi-circular bearing recess 74 of the rocker 54. This provides a tiltable transmissive connection between the rocker 54 and the wedge surface 68 of the control slide 52 with the advantage that the rocker 54 presses without clearance on the shoulder surfaces 60, 62 of the clamping slides in every phase of motion thereof.

Each of the clamping slides 44, 46 is returned into its release position by a pin or driver 76 and 78 formed by a cylindrical bolt fixedly disposed in the control slide 52 and engaging in a sloping slit 80 and 82 of the associated clamping slide 44 and 46, respectively. The sloping slits 80, 82 on the control slide 52 extend parallel with the wedge surface 68. However, the bolts and slits can be arranged in the opposite sense to one skilled in the art.

The clamping mechanism of the clamping device is designed so that the clamping slides 44, 46 are automatically retained in their clamped position. To this end the control slide 52, disposed completely within the holding device 10, supports a spring yoke 84 situated in the region of one of its ends and extends perpendicularly thereto and symmetrically with respect to its longitudinal axis and at the same time forming a connecting member for connecting the control slide 52 to an actuating rod 86 which extends from the holding device 10 parallel to the sliding direction of the control slide 52. The spring yoke 84 is displaced parallel to the clamping slides 44, 46 in a space 88 transversely to the longitudinal orientation of the rectilinear holding device to permit axial adjustment of the control slide. A plurality of compression springs 90, part of whose length is retained in cylindrical bores 92 provided in an inner wall part of the holding device 10, bear on the spring yoke 84. The compression springs 90 therefore tend to maintain the spring yoke 84, and therefore the control slide 52 together with the actuating rod 86, constantly in a position in which the clamping slides 44, 46 are in their clamped position against the mating surfaces of the work support 26.

Figure 3:
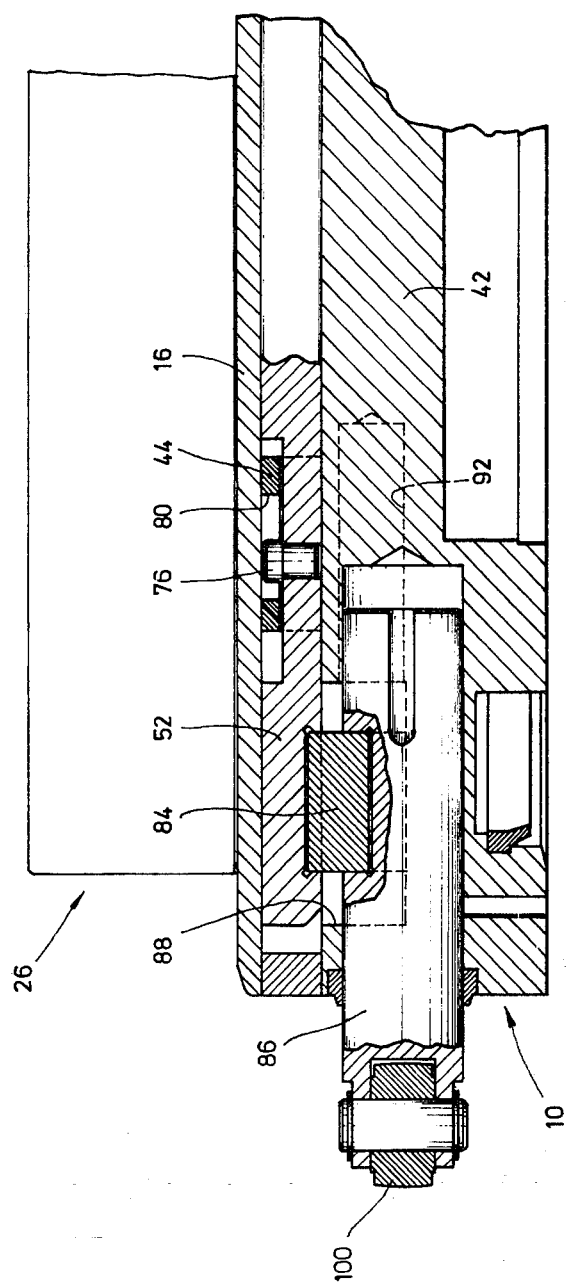
FIG. 3 is a partial section along the line 3—3 of FIG. 1.

To release the work support 26 from the holding device 10 the actuating rod 86 must therefore be displaced axially to the right as viewed in FIG. 3, whereupon the clamping slides 44, 46 are moved into their release position via the drivers 76, 78.

A stop abutment or engaging means 94, on which the driver 40 can act for moving the work support 26, is also mounted on the right-hand longitudinal side of the work support 26 as shown in FIG. 2.

The operation for changing a work support will now be described in detail by reference to FIGS. 4 to 9. First, the following special feature of the clamping device should be mentioned. Apart from the special embodiment and operation of the clamping slides 44, 46, the actuating rod 86 extending from the holding device 10 permits the clamping slides to be driven into their release position without the need for providing a separate actuating unit, as is the practice for known clamping devices, in order to adjust the control slide 52 against the spring force exerted by the compression springs 90. Instead, the outwardly extending actuating rod 86 automatically permits the clamping slides to traverse into the release position when the entire clamping device is displaced relative to a stationary stop abutment 96. Displacement in one direction is sufficient if the stop abutment has a sloping surface 98 on which a cam roller 100, supported on the free end of the actuating rod 86, is able to roll. It is therefore possible for the clamping of the work support 26 on the holding device 10 to be automatically released when the machine table for carrying out the work support change is driven into a changeover position. In the course of such motion the cam roller 100 of the actuating rod is able to move on the cam surface 98 and therefore enables the control slide 52 to be driven into its release position.

FIGS. 4 to 9 explain the advantage of the arrangement of the actuating rod 86. Instead of the actuating rod 86 it is possible for the control slide 52 itself to project with one of its ends from the holding device 10 in order to be actuated. FIGS. 4 to 9 diagrammatically illustrate a production machine with a headstock 102 having a work spindle 104. By means of the machine table 12 the clamping device 106 can be driven along orthogonal axes X and Z into the maximum end positions of the normal working range of the production machine as indicated in dash-dot lines in FIG. 4. The work support or pallet changing device 39, pivotable through 180° in each case about a pivoting axis 110, is disposed laterally of the production machine. The driver 40 which co-operates with the stop abutment 94 of the clamping device for transporting the work support 26 perpendicularly to the axis of the work spindle 104 is also provided in addition to the changeover device 39. The stationary stop abutment 96 with the cam surface 98 for actuating the rod 86 is also placed in the region of the changeover device 39.

Figure 4:
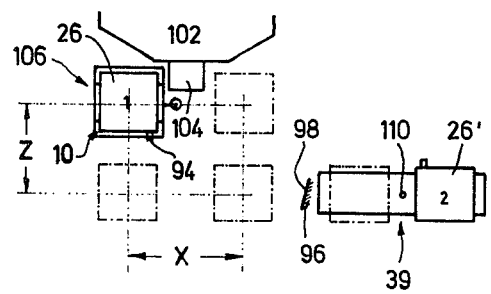
FIGS. 4 and 9 are diagrammatic views to explain the motions of a machine table and work support required to carry out a work-support change at a processing station.
Figure 5:
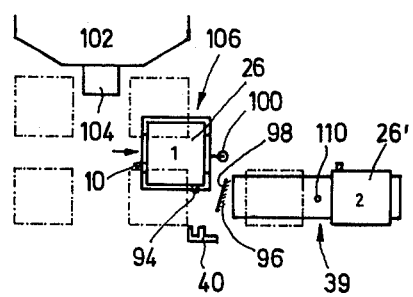

As indicated in FIG. 5 the machine table 12 must be driven into a position situated outside the normal operating range shown in FIG. 4 in order to perform a work-support change, so that the cam roller 100 of the actuating rod 86 can be moved into a standby position. Thereafter, according to FIG. 6, the machine slide 12 traverses so that the cam roller 100 of the actuating rod positively moves onto the sloping surface 98 of the stationary stop abutment 96. As a result of which the work support 26 to be changed is positively released from the holding device 10 when the clamping device moves into its changeover position.

Figure 6:
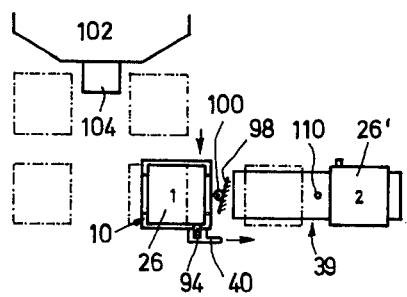
Figure 7:
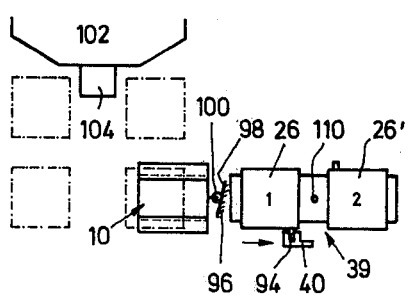

On arrival of the clamping device in the final changeover position according to FIG. 6, the driver 40 positively grips behind the stop abutment 94 of the work support 26. The driver 40 can then come into operation and transfer the work support 26 on the holding device 10 to the changeover device 39 on which a further work support 26' is already in the standby position.

Figure 8:
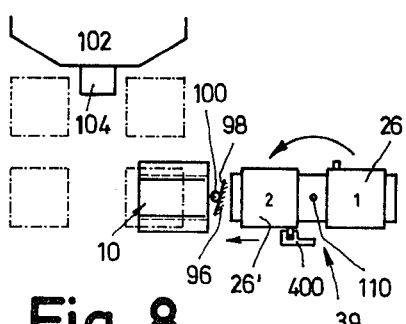
Figure 9:
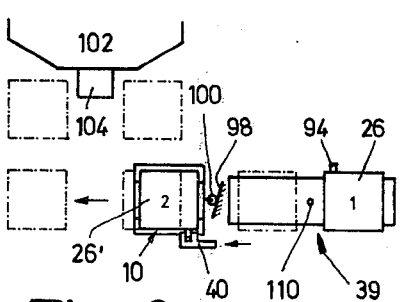

On completed takeover of the work support 26 which is to be exchanged, the changeover device 39 is pivoted through 180° so that, in accordance with FIG. 8, the work support 26', previously in the standby position, is now in the changeover position. Thereafter, the work support 26' is moved by the driver 40 to the holding device 10 of the machine table 12 in the changeover position. Subsequently the machine table 12 is driven back into the normal operating range of the production machine and the work support 26' which has been transferred is positively secured on the holding device 10 in the specific holding position by virtue of the fact that the cam roller 100 of the actuating rod 86 moves off the sloping surface 98. At the same time the driver 40 is automatically uncoupled from the work support 26'.

Thus, with the above-described clamping device, clamping and unclamping of the work support is performed positively in dependence on the machine table motion.

We claim:

1. In a machine including clamping device for locating and holding a workpiece at a processing station and locating and releasing a workpiece at a changeover station, said changeover station including a stationary stop abutment, comprising:
    holding means mounted on a bed of a machine table means moving said holding means along Y axes into and out of working relationship with the processing station and the changeover station; said holding means having rectilinear guide means thereon including spaced, parallel guide surfaces;
    a support means for supporting a workpiece, said workpiece support means being slidable on said guide surfaces of said holding means along its rectilinear length parallel to a longitudinal axis; said workpiece support means including:
    guide surface means adapted to be movable along the longitudinal axis of said rectilinear guide means, said workpiece support means having a complementary recess defined in part by two lateral sides; and
    clamping located in and means adapted to be movable transversely to said rectilinear guide means of said holding means, said clamping means being located solely within said recess when said work support is in overlying position with respect to said clamping means, operating means for said clamping means including a rod extending from one side of said holding means to be engageable with said stop abutment when said holding means is at the changeover station for releasing said workpiece support means to permit sliding movement of said workpiece support along said parallel guide surfaces of said holding means onto the changeover station, said clamping means having at least one mating surface cooperating with at least one of said lateral sides on said workpiece support means.

2. A machine as defined in claim 1 wherein said one mating surface and said one lateral side define surfaces of a dovetail juncture.

3. A machine as defined in claim 1 wherein said one mating surface and said one lateral side define mating surfaces that comprise:
    slanting teeth on said mating surface of said clamping means; and
    slanting teeth on said lateral side of said work support.

4. A machine as defined in claim 1 wherein both lateral sides of said rectilinear guide means are in the form of a tenon.

5. A machine as defined in claim 1, comprising:
    a control slide means; and
    a spring means cooperating with said control slide means and clamping means; whereby said clamping means is movable to a temporary unlocked position by longitudinal movement of said control slide, and movable to a locking position by return movement of said control slide effected by the bias of said spring means.

6. A machine as defined in claim 5, wherein said clamping means includes two clamping slides which are disposed parallel and at a distance from each other and adapted to be movable from a clamping position to a release position by said control slide means.

7. A machine as defined in claim 6, further comprising:
    driver means mounted in said control slide;
    slot means in said clamping slides;
    said driver means adapted to move in said slot means; whereby longitudinal movement of said control slide is adapted to move said clamping slides into or out of engagement with said work support means.

8. A machine as defined in claim 7 further comprising:
    support shoulders formed by a recess on each of said clamping slides;
    rocker means disposed between said clamping slides and engaging said shoulders in each recess on said clamping slides;
    said rocker means having a wedge surface midway between the ends of said rocker means;

a wedge surface formed by a recess on one side of said control slide midway between the ends thereof;

the slope of each of said wedge surfaces being colinear and in the same plane;

whereby longitudinal movement of said control slide results in a transverse movement of said rocker means via said wedge surfaces and said transverse movement of said rocker means results in a similar movement of said clamping slides via said support shoulders.

9. A machine as defined in claim 8, wherein said wedge surface on said rocker means being a rolling member, said rolling member having a wedge surface on one side and a semi-circular surface opposite to said wedge surface engaging a semi-circular recess in said rocker means; whereby said rolling member is adapted to transmit the longitudinal movement of said control slide to a transverse movement of said rocker means throughout the total distance moved by said control slide.

10. A machine as defined in claim 5 wherein said control slide means further comprises:

spring yoke connected to said actuating rod and said control slide disposed in a recess in said holding device;

said spring yoke adapted to move in a longitudinal direction along said longitudinal axis;

whereby longitudinal movement of said control slide along said longitudinal axis is adapted to clamp and unclamps said clamping means to said work support.

11. A machine as defined in claim 10 wherein said spring yoke extends transverse to said longitudinal axis and maintained in a clamping position by said spring means.

12. A machine as defined in claim 1 further including engaging means provided on at least one side of said work support adapted for engagement with a driver means for transporting said work support along said guide means.

13. In a machine including a clamping device for locating a workpiece at a given processing station and at a changeover station said changeover station including a stationary stop abutment comprising:

a holding device for mounting at a processing station means moving said holding means along an X-Y axes into and out of working relationship with the processing station and the changeover station; said holding device having rectilinear guide means thereon including spaced parallel guide surfaces, a work support for supporting a workpiece, clamping means for clamping the work support onto the holding device on said guide surfaces said clamping means being disposed in the holding device and having an actuating rod extending from one side thereof to selectively engage the stop abutment for releasing the work support from that holding device, said guide surfaces being located on either side of said actuating rod and said work support including a complementary recess being configured to be slideable on said guide surfaces from said holding device to the changeover station along the axis of said actuating rod when it engages the stop abutment.

14. In a machine as defined in claim 13 further comprising a spring means, a rectilinear guide, a final control element, said final control element including a control slide disposed in said holding device, substantially parallel with said rectilinear guide and adapted to slide against the bias of said spring means, and said actuating rod connected to said control slide and projecting in the slidable direction of said control slide from a side wall of said holding device.

* * * * *